United States Patent
Moschkau et al.

[11] 3,711,679
[45] Jan. 16, 1973

[54] WINDSHIELD DE-ICER

[75] Inventors: George L. Moschkau, St. Paul, Minn.; Arlin Lee Miller, New Richmond, Wis.

[73] Assignee: Sterling Products Company, Inc., St. Paul, Minn.

[22] Filed: Feb. 11, 1971

[21] Appl. No.: 114,561

[52] U.S. Cl. .................219/227, 15/105, 15/236, 15/245, 30/140, 219/228, 219/533
[51] Int. Cl. ...........................A47l 1/06, H05b 1/00
[58] Field of Search............219/221, 227, 228–231, 219/533; 15/236 R, 105, 245; 30/140

[56] References Cited

UNITED STATES PATENTS

| | | | |
|---|---|---|---|
| 2,719,905 | 10/1955 | Lootens | 30/140 |
| 2,700,096 | 1/1955 | Clements | 30/140 |
| 2,511,161 | 6/1950 | Hammond | 30/140 |
| 2,517,247 | 8/1950 | Seley | 15/105 |
| 355,298 | 1/1887 | Bourke | 15/245 |
| 3,091,790 | 6/1963 | Schroeder | 15/105 |
| 3,540,071 | 11/1970 | Jorgensen | 15/105 |
| 2,699,614 | 1/1955 | Welch | 15/236 R |
| 2,779,854 | 1/1957 | Helbling | 219/227 |
| 2,169,206 | 8/1939 | Krongold | 15/245 |

Primary Examiner—A. Bartis
Attorney—Stryker & Jacobson

[57] ABSTRACT

A windshield cleaning device for removing ice from a vehicle windshield includes a handle provided at one end with an electric heating element and a wiping member. The heating element is disposed transversely of the handle axis and includes an elongated substantially straight cylindrical heating section for melting ice on the windshield and for scraping ice off the windshield. The wiping member is positioned transversely of the handle and projects substantially at right angles to the heating element and includes a cylindrical rod having a flexible squeegee member thereon. The heating element is energized through a connector adapted to be plugged into the lighter receptacle on the vehicle.

2 Claims, 3 Drawing Figures

INVENTORS
GEORGE L. MOSCHKAU
ARLIN L. MILLER

BY *Stryker & Jacobson*

ATTORNEYS

WINDSHIELD DE-ICER

BACKGROUND OF THE INVENTION

1. Field of the Invention.

This invention relates generally to window cleaning devices and, more specifically, to a multiple purpose window cleaning device suitable for use on automobiles that are operated in frigid climates.

2. Description of the Prior Art.

There are numerous devices for cleaning ice and snow from automobile windshields during the frigid months. Typically, during these frigid months, ice or snow becomes caked on the windshield when one parks the car. During operation of the car the warm air from the auto heater melts the ice and snow as it falls on the windshield. However, when the car is stopped, the car cools off causing any water on the windshield to form a sheet of ice. The ordinary wiping action of the windshield wiper blades is insufficient to remove the ice and it oftentimes causes the windshield wiper blades to be ruined by the coarse, abrasive ice on the windshield. In order to remove the ice and the snow from the windshield, a driver generally uses a hard surfaced scraper or a hard rubber flexible scraper. If the ice on the windshield is rather light, the scraper works rather well. However, oftentimes the windshield ice becomes thick and the operator working with a hard surface scraper made out of plastic or the like inadvertently breaks the handle of the scraper or breaks the scraper as he attempts to clean the thick, hard ice from the windshield. This usually causes irritation and frustration to the driver while preventing him from obtaining a clean window.

There are other scrapers that are made of metal, however, the hard, sharp edges of metal scrapers generally are not preferred because during cold weather they can quite readily scratch the surface of the windshield. Thus, one can easily damage his windshield with a sharp edge metal scraper to say nothing of the brute force that is required to force ice off the windshield.

The present invention eliminates the difficulty associated with the prior art ice scrapers and allows one to quickly and easily remove the ice from the windshield of a car. In addition, a wiping surface or squeegee on the present invention also allows the operator to clean and wipe the windshield so that he can clearly view the outside world from the interior of his automobile.

SUMMARY OF THE INVENTION

Briefly, the invention comprises a member having a smoothly contoured heating element for scraping and melting ice from the windshield and a squeegee for wiping the water and the ice from the windshield. The invention is further provided with a receptacle for plug in to the cigar lighter of an automobile.

BRIEF DESCRIPTION OF THE DRAWING

Referring to the drawings.

BRIEF DESCRIPTION OF THE PREFERRED EMBODIMENT

Figure 1:
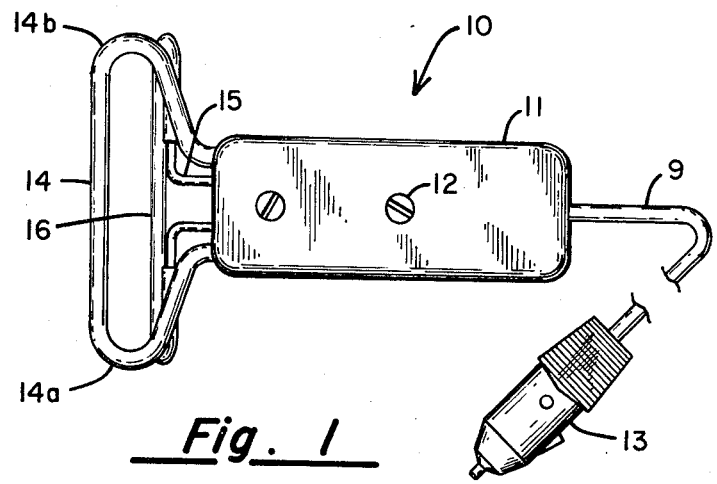
FIG. 1 is a top view of our windshield de-icer.
Figure 2:
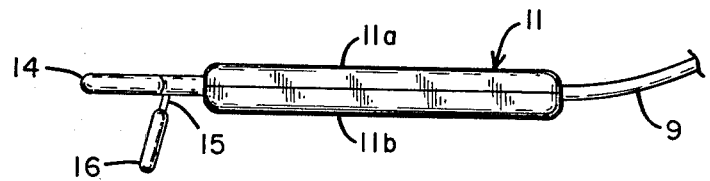
FIG. 2 is a side view of our de-icer.
Figure 3:
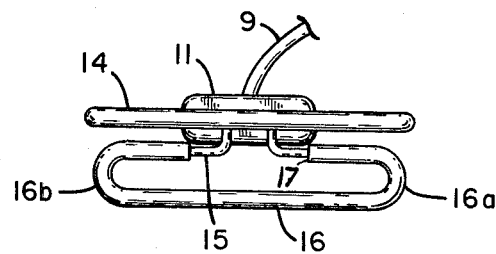
FIG. 3 is a front view of our de-icer.

Referring to the drawing, FIG. 1, reference numeral 10, generally designates our portable automobile windshield de-icer. De-icer 10 comprises a nonconducting handle 11 which is comprised of grips 11a and 11b that are held together by screws 12. Extending from one end of handle 11 is a smoothly contoured electrical heating element 14 that comprises a cylindrical straight section and curved ends 14a and 14b that bend backward into handle 11. Located adjacent to heating element 14 is another smoothly contoured member 16 which also comprises a straight section and curved ends 16a and 16b that curve backward into handle 11. Located on the outside of member 16 is a pliable squeegee member 17 that can be used to wipe water from the windshield. Located on the opposite end of handle 11 is an electric cord 19 that supplies power to heating element 14 through a connector 13 that can be inserted into a suitable power source such as the cigar lighter of a conventional automobile.

In operation of the windshield de-icer, the operator plugs connector 13 into the cigar lighter of his automobile. Within a few moments the heating element 14 becomes sufficiently hot to melt ice. The operator then can easily slide or push the ice off the windshield. After the operator has made repeated passes over the windshield and thus loosens and removes the ice from the windshield, a film of water will remain on the windshield. The operator then immediately reverses the unit and pulls squeegee 17, which is located substantially at a right angle to the heating element, across the windshield to remove any water left by the melting of the ice. The windshield is thus not only de-iced but is cleaned in the same process.

The particular arrangement of the heater and the squeegee shown in the drawing is preferred because the operator can exert a greater force on the heating element to loosen a stubborn piece of ice on the windshield if he so desires. Also, with the squeegee located at an angle to the heating element, the operator can alternately make a pass to de-ice and clean the windshield.

In another embodiment of our invention we have placed a switch in the handle of the unit so the power can be turned on or off at will by the operator. However, without the switch the operator can pull connector 13 from the cigar lighter to disconnect the power to the heating element.

We claim:

1. In a multipurpose windshield cleaning device of the class described comprising:
   a heating element, said heating element having an elongated substantially straight cylindrical heating section for melting ice on a windshield and for scraping ice off a windshield;
   means for electrically powering said heating element so that said heating element is operable for simultaneously melting and scraping ice off the windshield;
   a wiping member positioned substantially at right angles to the heating element for cleaning the surface of the windshield; and a handle having a central axis and connected at one end to said heating element and said wiping member with said element and member extending substantially transversely thereof to thereby allow the operator to remove ice from the windshield and wipe the windshield with a single device.

2. The invention of claim 1 wherein said wiping member comprises a cylindrical rod having a flexible wiping member thereon.

* * * * *